(12) United States Patent
Plummer et al.

(10) Patent No.: US 6,208,664 B1
(45) Date of Patent: Mar. 27, 2001

(54) HDSL MODULES FOR TELECOMMUNICATIONS CHANNEL UNIT CARDS

(75) Inventors: William M. Plummer, McKinney; Rudolph B. Klecka, III, Dallas, both of TX (US)

(73) Assignee: Alcatel USA Source L.P., Plano, TX (US)

( * ) Notice: Subject to any disclaimer, the term of this patent is extended or adjusted under 35 U.S.C. 154(b) by 0 days.

(21) Appl. No.: 09/014,040

(22) Filed: Jan. 27, 1998

(Under 37 CFR 1.47)

(51) Int. Cl.[7] .................................................. H04J 1/00
(52) U.S. Cl. .................................... 370/480; 370/437
(58) Field of Search ..................... 370/480, 426, 370/384, 437, 236, 396, 401; 379/6, 8, 12, 333, 27

(56) References Cited

U.S. PATENT DOCUMENTS

| | | |
|---|---|---|
| 4,993,019 | 2/1991 | Cole et al. . |
| 5,014,268 | 5/1991 | Tyrrell et al. . |
| 5,105,421 | 4/1992 | Gingell . |
| 5,237,563 | 8/1993 | McNulty . |
| 5,243,593 | 9/1993 | Timbs . |
| 5,267,236 | 11/1993 | Stephenson, Jr. . |
| 5,267,309 | 11/1993 | Sanders et al. . |
| 5,355,362 | 10/1994 | Gorshe et al. . |
| 5,666,574 | 9/1997 | Ogawa . |
| 5,694,398 | 12/1997 | Doll et al. . |
| 5,926,480 | * 7/1999 | Deschaine et al. ................. 370/401 |
| 5,953,318 | * 9/1999 | Nattkemper et al. ............... 370/236 |
| 5,956,343 | * 9/1999 | Cornes et al. ..................... 370/437 |

FOREIGN PATENT DOCUMENTS

WO 96/29841    9/1996  (WO) .

* cited by examiner

*Primary Examiner*—Michael Horabik
*Assistant Examiner*—Prenell Jones
(74) *Attorney, Agent, or Firm*—Fish & Richardson, P.C.

(57) ABSTRACT

A telecommunications channel unit card including a subscriber bus interface for communicating subscriber bus signals with a digital loop carrier matrix, wideband channels for communicating wideband telecommunications signals with the subscriber bus interface and an external network, and at least one high-bit-rate digital subscriber line (HDSL) module capable of being coupled selectively to at least one of the wideband channels to facilitate HDSL-based communications between the telecommunications channel unit card and the external network.

13 Claims, 13 Drawing Sheets

HDSL MODULES FOR TELECOMMUNICATIONS CHANNEL UNIT CARDS

BACKGROUND

This invention is related to high-bit-rate digital subscriber line (HDSL) modules for telecommunications channel unit cards.

In the early days of telecommunications, a copper wire was used to carry a single information channel. Because the large majority of cost is in the materials and construction of the physical link, telephony engineers since have developed ways to pack multiple communications channels onto a single physical link. Frequency division multiplexing (FDM) and time division multiplexing (TDM) have been devised to multiplex multiple streams of analog and pulse code modulation (PCM) digital signals, respectively, into a single stream. For digital signals, the time division multiplexing hierarchy is represented as DS0 (Digital Signal) through DS4, where a DS0 is a single 0.064 Mb/s channel, a DS1 is 24 DS0s multiplexed together, a DS2 is 96 DS0s multiplexed together, a DS3 is 672 DS0s multiplexed together, and a DS4 is 4,032 DS0s multiplexed together. The hierarchy DS1 through DS4 also is referred to as T1, T2, T3, and T4 when using a copper medium for transmission.

A similar time division multiplexing scheme, based on International Telecommunication Union CCITT's G.700 Series Recommendations, uses a 32-channel format referred to as E1, or CEPT-1, where each channel corresponds to a DS0 (0.064 Mb/s) signal. Thus, a E1 signal is based on 32 DS0s multiplexed together, a E2 is 128 DS0s multiplexed together, a E3 is 512 DS0s multiplexed together, and a E4 is 2,048 DS0s multiplexed together.

A digital loop carrier (DLC) at a central terminal (CT) is a multiplexor which can multiplex multiple analog and digital signals from subscriber telephone lines into a single multiple digital signal such as a T1/E1 signal. A mirror DLC located at a remote terminal (RT) can decode the multiplexed T1/E1 signal into a form suitable for transmission over subscriber telephone lines. This data flow also occurs in the opposite direction from RT to CT.

Each DLC essentially is a special purpose computer containing standard control, memory, power, etc. components but also a number of interface cards (line cards) for converting analog and digital signals from subscriber telephone lines into formatted digital data signals. Different types of interface cards service different types of subscriber telephone lines. Examples of interface cards include POTS (Plain Old Telephone Service) cards for analog telephone lines, FOX cards for fiber optic lines, ISDN (Integrated Services Digital Network) cards for ISDN lines, and a number of other wideband service option cards. After the appropriate interface cards convert the subscriber telephone line signals into formatted digital data signals, a DLC at a central terminal constructs a single E1 signal by means of time division multiplexing. At a remote terminal, the DLC decodes the E1 signal to deliver formatted digital data back to the interface cards. Interface cards convert the formatted digital data into a form suitable for transmission over subscriber telephone lines. The most mature technology for transmitting over these lines (e.g., standard unshielded twisted pair) is HDSL. HDSL, which involves special electronics at both the central office and the customer premise, allows the provisioning of T1/E1 local loop circuits much more quickly and at much lower cost than through conventional means.

SUMMARY

In general, in various implementations, the invention may include one or more of the following features.

A telecommunications channel unit card includes a subscriber bus interface for communicating subscriber bus signals with a digital loop carrier matrix, wideband channels for communicating wideband telecommunications signals with the subscriber bus interface and an external network, and at least one high-bit-rate digital subscriber line (HDSL) module capable of being coupled selectively to at least one of the wideband channels to facilitate HDSL-based communications between the telecommunications channel unit card and the external network.

The telecommunications channel unit card can include at least one span circuit including a line interface unit (LIU) portion and a channel framer portion.

The HDSL module can be coupled to at least one of the wideband channels through the channel framer portion of the span circuit.

The outgoing wideband telecommunications signals received from at least one of the wideband channels can be framed using the channel framer portion of the span circuit.

The telecommunications channel unit card also can include a conversion circuit for converting subscriber bus signals and wideband telecommunications signals.

The wideband telecommunications signals can comprise E1 or T1 signals.

The digital loop carrier matrix can comprise a bandwidth allocator, processor and timing unit (BPT) card.

In general, in another aspect, a method of configuring a telecommunications channel unit card includes providing a subscriber bus interface for communicating subscriber bus signals with a digital loop carrier matrix, connecting the subscriber line interface with wideband channels, and selectively coupling a high-bit-rate digital subscriber line (HDSL) module to at least one of the wideband channels to enable HDSL-based communications.

The channel unit card can include at least one span circuit having a line interface unit (LIU) portion and a channel framer portion.

The HDSL module can be coupled to at least one of the wideband channels through the channel framer portion of the span circuit.

The outgoing wideband telecommunication signals from at least one of the wideband channels can be framed using the channel framer portion of the span circuit.

In general, in another respect, a method of configuring the channel unit card of claim 8 includes converting the subscriber bus interface signals and the wideband telecommunications signals.

The wideband telecommunications signals can comprise E1 or T1 signals.

The digital loop carrier matrix can comprise a bandwidth allocator, processor, and timing unit (BPT) card.

In general, in another respect, a telecommunications channel unit card includes a subscriber bus interface for communicating subscriber bus interface (SBI) signals with a bandwidth allocator, processor and timing unit (BPT) card, wideband channels including a processor capable of processing message-based applications, an application specific integrated circuit (ASIC) between the subscriber bus interface and span circuits capable of converting the subscriber bus interface signals and E1 signals, and three span circuits each including one line interface unit (LIU) portion and one E1 framer portion for interfacing between the ASIC and an external network, the E1 framer portion framing the E1 signals for transmission over the external network and for recovering the E1 signals from reception over the external network, the line interface unit capable of connecting to the external network when the channel unit card functions as an E1 card, and two high-bit-rate digital subscriber line (HDSL) modules having their clocks and signals pins connected to the corresponding clocks and signals pins of two corresponding E1 framer portions to facilitate HDSL-based communications between the telecommunications channel unit card and the external network.

Advantages may include one or more of the following. A card that sends and receives multiple HDSL signals is able to send and transmit multiple signals per card, thus lowering the per-line cost. Because only one card needs to be manufactured to produce both a multiple E1 card and a multiple HDSL card, the cost per line is further reduced. Moreover, having channel cards that contain multiple signal channels allow more subscribers to be served.

Additional features and advantages of the invention will be readily apparent from the following description, drawings, and claims.

DETAILED DESCRIPTION

Figure 1:
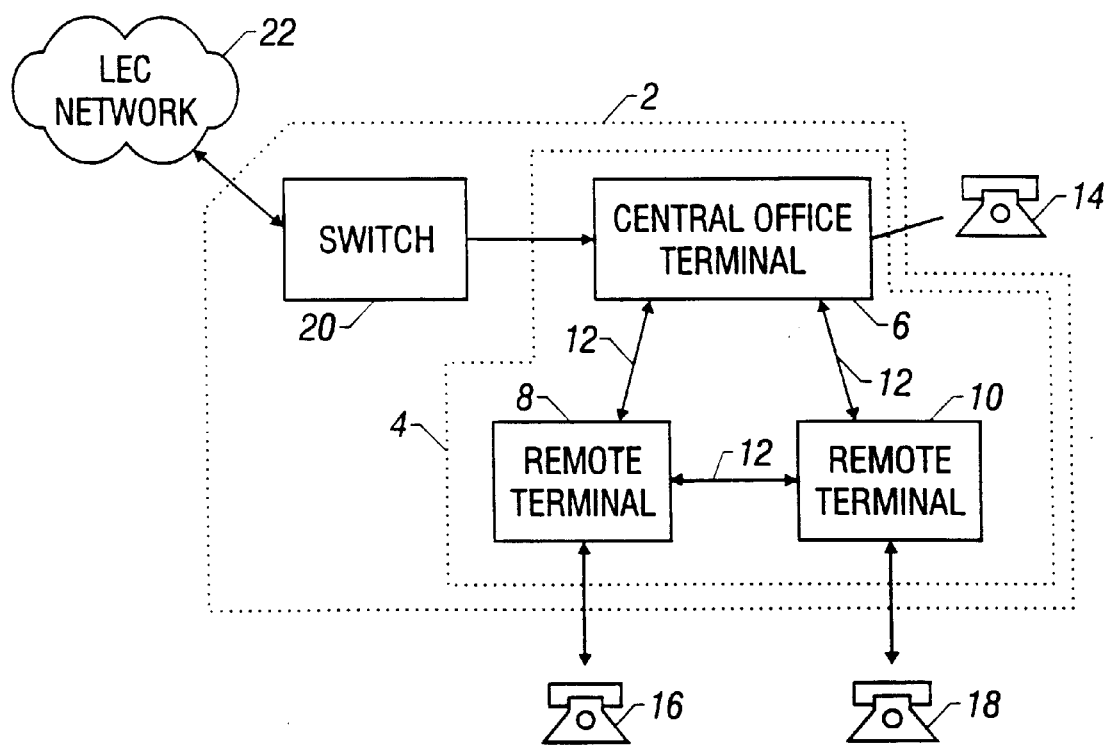
FIG. 1 is a block diagram of a distributed local services switching system.

As shown in FIG. 1, a telecommunications system 2 includes a digital loop carrier (DLC) 4. The digital loop carrier 4 includes a central office terminal (CT) 6 coupled to one or more remote terminals (RT) 8, 10 via metallic, fiber or other suitable communication media 12. The digital loop carrier 4 acts as a delivery unit for the system 2 by delivering call control and management signals. Subscriber devices, such as telephone service equipment 14, 16, 18, can be coupled to the central office terminal 6 and to the remote terminals 8, 10, respectively. The central office terminal 6 also is coupled to a local exchange carrier (LEC) network 22. The central office terminal 6 may be coupled to the LEC network 22 through a switch 20, such as a class 5 switch. In different implementations, the switch 20 and LEC network 22 operate according to a protocol that uses either message-oriented signaling, such as the International Telecommunications Union Telecommunications (ITU-T) standard, or bit-oriented signaling, such as Channel Associated Signaling (CAS). Other message-oriented and bit-oriented protocols can be used instead or in addition.

Figure 2:
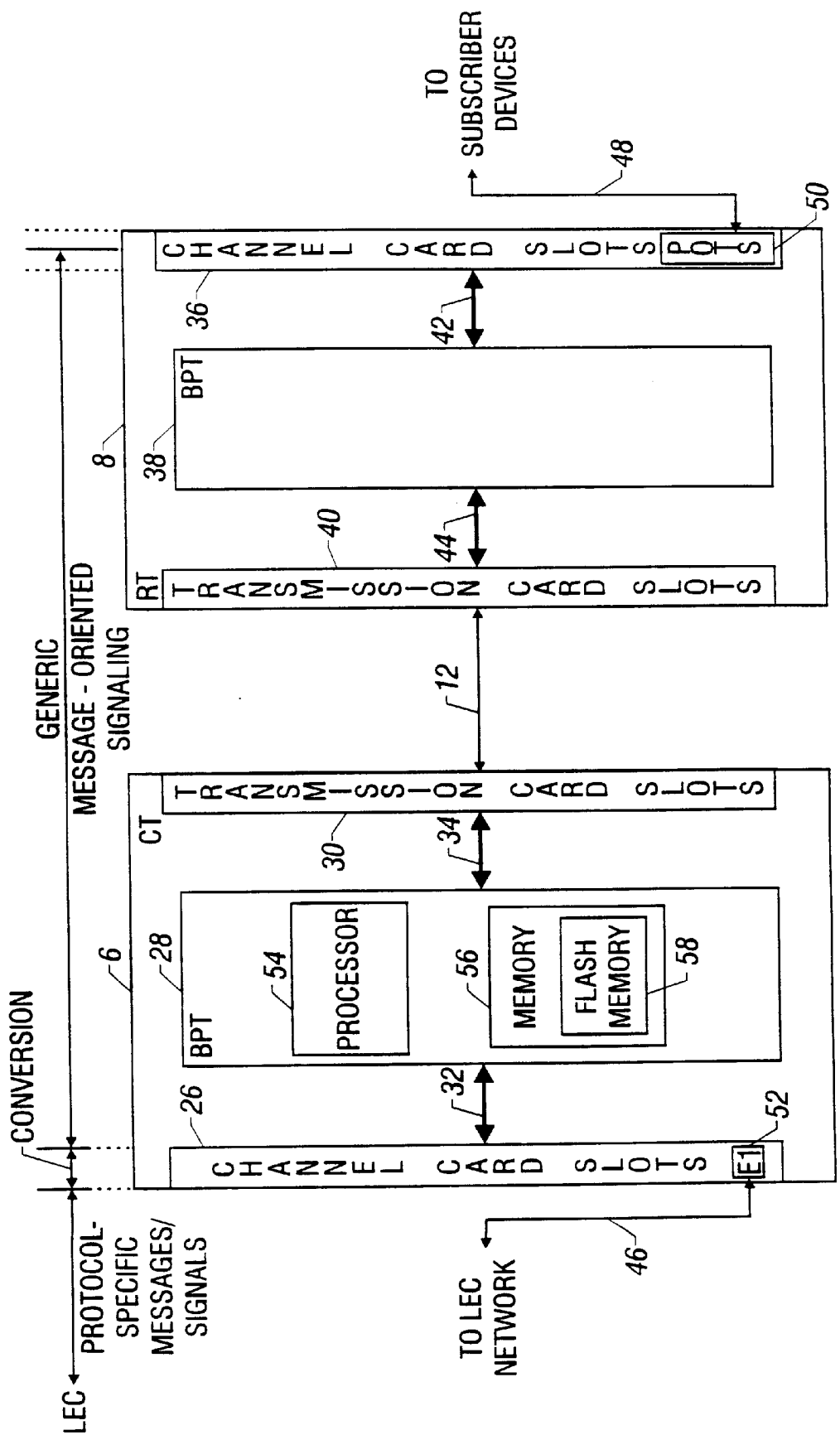
FIG. 2 is a partial block diagram of a digital loop carrier.

As shown in FIG. 2, the central office terminal 6 and the remote terminals, such as terminal 8, have one or more channel unit card slots, such as slots 26, 36, respectively, to accommodate channel unit cards which carry data signals to and from subscriber lines 48 and LEC network lines 46. The subscriber lines 48 are coupled to subscriber devices, such as the telephone 16 (FIG. 1). The LEC network lines 46 are coupled to the LEC network 22 (FIG. 1). Channel unit cards convert incoming subscriber line data signals into formatted digital data and convert formatted digital data into data signals suitable for transmission over the subscriber lines.

Different channel unit cards serve different kinds of narrowband (e.g., POTS, COIN, UVG/EWG, Four-Wire E&M, Universal Four-Wire, Basic Rate Interface Unit) and wideband (ISDN, DS1U, T1U, ADS1U, AT1U, E1, E1 Short Haul, E1 Long Haul and E1Conc) subscriber lines. As shown in FIG. 2, for example, a POTS card 50 is inserted in one of the channel unit card slots 36 at the remote terminal 8 for connection to a subscriber device. Similarly, an E1 card 52 is inserted into one of the channel unit card slots 26 at the central office terminal 6 for coupling signals to the LEC network 22. An E1 card is a 2-Megabit card that uses thirty-two channels in which each channel, or time slot, corresponds to a 64 kilobit per second (Kb/s), or DS0, signal. The slots 26, 36 also can accommodate additional channel unit cards of the same or different types.

As further shown in FIG. 2, each of the central office terminal 6 and the remote terminal 8 also includes one or more transmission card slots 30, 40 to accommodate transmission cards. Transmission cards enable the terminals 6, 8 to communicate over the communication medium 12. The transmission cards handle the conversion between the communication medium 12 signals and electric signals that the terminals 6, 8 can understand and process.

Different transmission cards support different communication media. E1 cards, for example, can be used to support communications over metallic media, and optical line unit cards can be used for fiber optic communications. The E1 format can be used, for example, with time division mutiplexing (TDM) techniques based on the International Telecommunication Union CCITT's G.700 Series Recommendations.

The central office terminal 6 and the remote terminals 8 each includes at least one bandwidth allocator, processor and timing unit (BPT) card 28, 38. Each BPT card 28, 38 collects formatted digital signals from its respective channel unit cards in the slots 26 or 36 and multiplexes them into a time domain multiplexed (TDM) signal. The multiplexed signal then can be sent over the transmission medium 12 via transmission cards in the slots 30 and 40, respectively. The BPT cards 28, 38 also receive TDM signals from their respective transmission cards. The BPT cards 28, 38 demultiplex the received TDM signals and route them for delivery to their respective channel unit cards in slots 26, 36. Respective subscriber bus interfaces 32, 42 are used to send signals between the channel unit cards in the slots 26 or 36 and their corresponding BPT cards 28 or 38. Similarly, octal buses 34, 44 are used to send signals between the transmission cards in the slots 30, 40 and their corresponding BPT cards 28 or 38.

In general, each BPT card, such as the BPT card 28, includes a processor 54, such as a microprocessor or a microcontroller, as well as various forms of associated memory 56. The memory 56 includes flash memory 58 such as electrically erasable programmable read only memory (EEPROM) as well as other types of memory, such as random access memory (RAM) and read only memory (ROM). The BPT card 38 can be similar to the BPT card 28. Additional details of the BPT cards 28, 38 are described, for example, in a U.S. Patent Application, entitled "Telecommunications Terminal" and filed on Nov. 14, 1997, which is assigned to the assignee of the present invention and which is incorporated herein by reference in its entirety.

Figure 3:
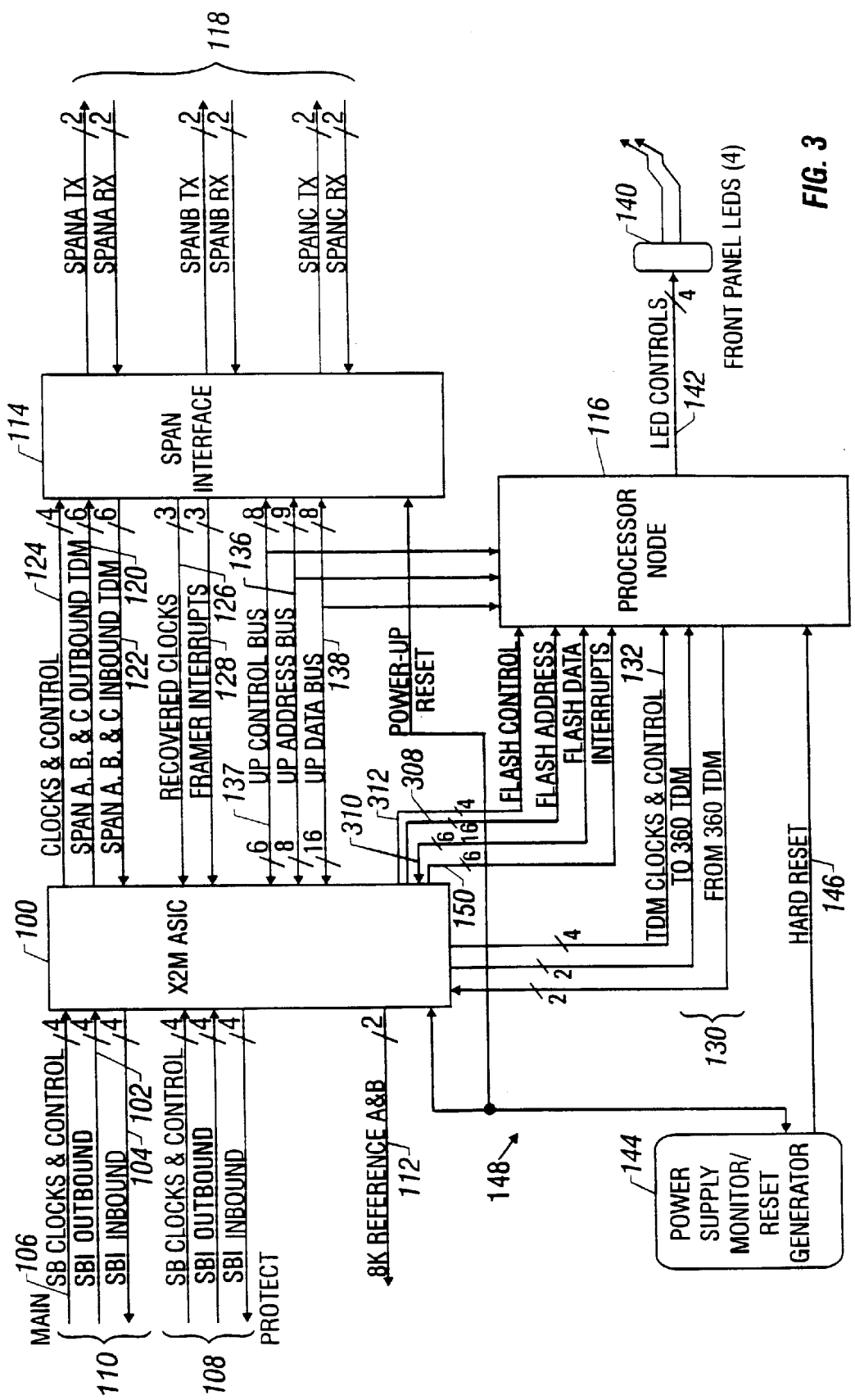
FIG. 3 is a functional block diagram of a channel unit card.

As shown in FIG. 3, an E1 card receives signals in the E1 format and remaps them into subscriber bus interface (SBI) format and vice versa. The E1 card includes an application specific integrated circuit (ASIC) 100 which serves as the standard E1 interface between a subscriber bus interface 108, 110, a processor node 116, and a span interface 114. "Span" refers to that portion of a high-speed digital system that connects one central office to another central office or one terminal office to another terminal office. Each card supports up to three E1 spans, utilizing up to either four single density SBIs or two double density SBIs. The card has an outbound SBI bus 102 and an inbound SBI bus 104 to transmit and receive E1 signals accordingly. Both buses are managed by a SB clock and control 106. A protection bus 108, usually in standby mode, serves as backup to a main bus 110. If the main bus 110 becomes unavailable, signals would be routed through the protection bus 108. Additionally, the ASIC 100 provides an 8 KHz synchronization reference 112 to one of the BPT cards 28, 38 (FIG. 2) and external interrupts 150 to the processor node 116. Furthermore, the ASIC 100 generates a subscriber bus data link (SBDL), which is a data link layer protocol used by the subscriber bus, and a reset detect. The ASIC 100 also optionally performs companding conversion (A-law to u-law and u-law to A-law) and programmable transmission level point (TLP) adjust via an EEPROM 302 (FIG. 5) located inside the processor node 116.

The span interface 114 includes three identical circuits for transmitting and receiving three E1 signals 118. Upon being received, the three E1 signals 118 are processed (e.g., digitized, framed, and time division multiplexed). Then, the processed signals are sent to the ASIC 100 via six inbound TDM buses 122. In the outbound case, the SBI signal 102 from the ASIC 100 travels to the span interface via six outbound TDM buses 120. The clocks and control are sent by the ASIC 100 to the span interface via the clocks and control bus 124. The span interface 114 also provides the receive clocks 126 and framer interrupts 128 to the ASIC 100.

The processor node 116 functions mainly as the controller of this card. This node interfaces with the span interface 114 and the ASIC 100 to provision and control their functionality, monitor status, and communicate with one of the BPT cards 28, 38 (FIG. 2) over the SBDL via a microprocessor control bus 137 and an address bus 136. Data for provisioning and control travels among the processor node, ASIC, and span interface on a microprocessor data bus 138. For message-oriented applications, the ASIC 100 remaps the software selectable channels of the E1 spans to and from the TDM bus 130. High level data link control (HDLC) could be used for this type of applications. HDLC is a link layer protocol standard for point-to-point and multi-point communications where the control information is always placed in the same position and specific bit patterns used for control differs dramatically from those used in representing data, so that errors are less likely to occur. HDLC protocol messages, which are in the data streams being transmitted and received by the ASIC 100, are direct memory accessed (DMA), and an interrupt is generated. This process is maintained by a TDM clock and control bus 132. A flash control 312, flash address 308, and flash data 310 allow the ASIC 100 to access the EEPROM 302. Interrupts 150 are sent from the ASIC 100 to the processor node 116. The processor node 116 also controls the front panel LEDs 140 via the LED controls 142.

A power supply monitor/reset generator 144 provides a reset pulse 148 on power up and low voltage conditions. The generator 144 also provides a hard reset 146 to the processor 116.

Figure 4:
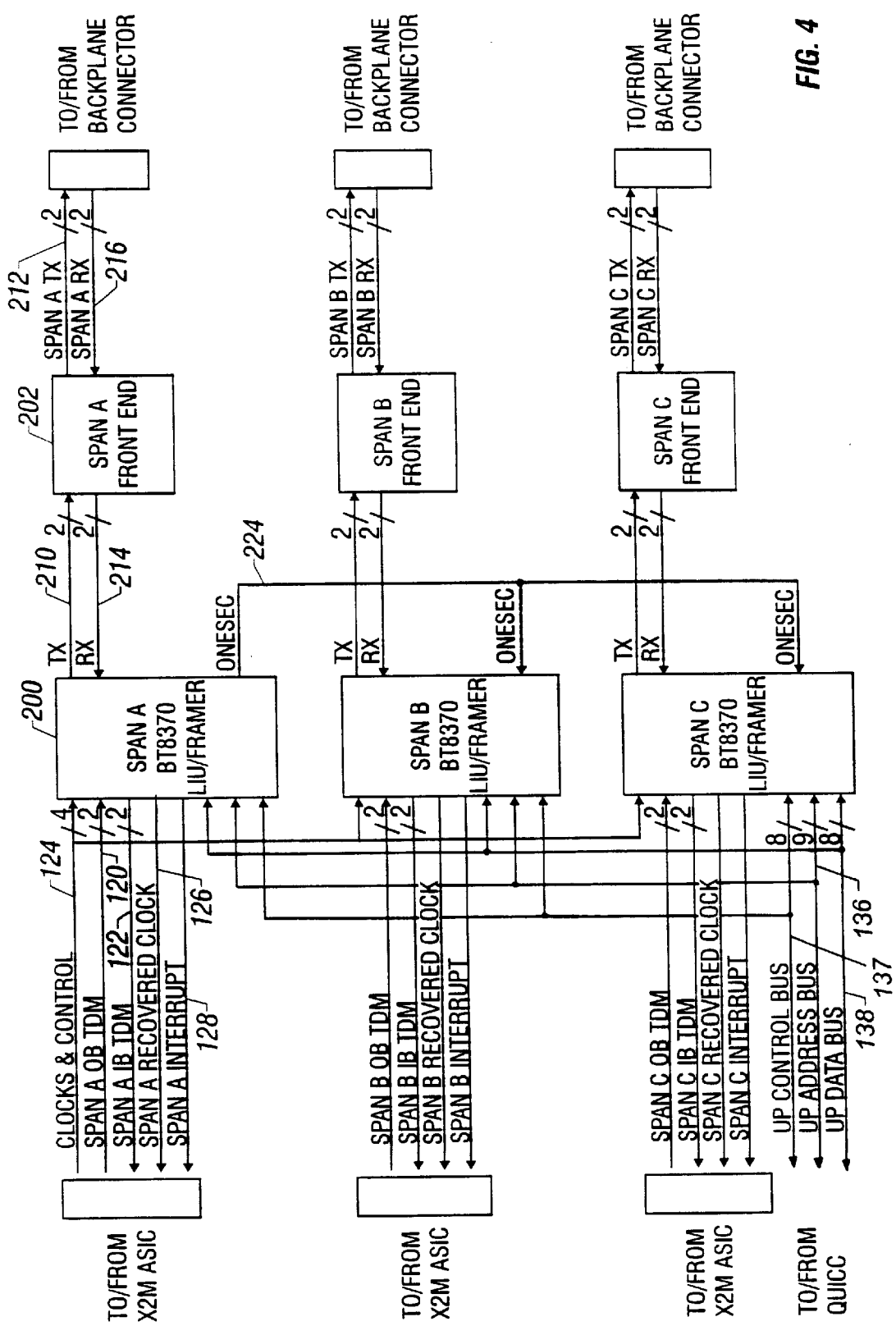
FIG. 4 is a functional block diagram of a span interface.

As shown in FIG. 4, the span interface 114 includes three identical circuits (spans A, B, and C) each of which includes a line interface unit (LIU)/framer 200 and a front end 202. Because the three circuits are identical, only one will be described herein, with the understanding the same description applies to the other two.

In the transmit direction, the outbound TDM bus 120 from the ASIC 100 are input to the LIU/framer 200. The framer portion and the LIU portion could be on a single chip. The framer inserts framing bits so the receiver can identify the channels and time slots, and the LIU allows the framer to interface with the physical lines. The TDM data and signaling are converted and routed to the LIU transmitter and are outputted 210 to the front end 202 as differential alternate mark inversion (AMI) data which is an analog form of the E1 signal. The AMI data is sent over a span transmit 212 to a transmitting medium such as the LEC network lines 46 (FIG. 2). In the receive direction, the LIU receiver receives the AMI data inputs 214 from the front end 202 via the span receive 216. The framer portion of the LIU/framer 200 then formats the resulting data and signaling information into a TDM stream and sends the stream over the inbound TDM bus 218. The front end 202 protects the transmit and receiving lines from an exposed environment. The recovery line rate clock 126, used for system synchronization, and the span interrupt 128 are outputted to the ASIC 100. The ASIC 100 (FIG. 3) is controlled through a register set accessible via the microprocessor control bus 137, address bus 136, and data bus 138. The clocks and control 124 signal from the ASIC 100 provides synchronization for all three spans. A ONESEC bus which carries a ONESEC signal 224 from span A's framer and delivers it to span B and C. The signal is used to synchronize the spans' status reports.

Figure 5:
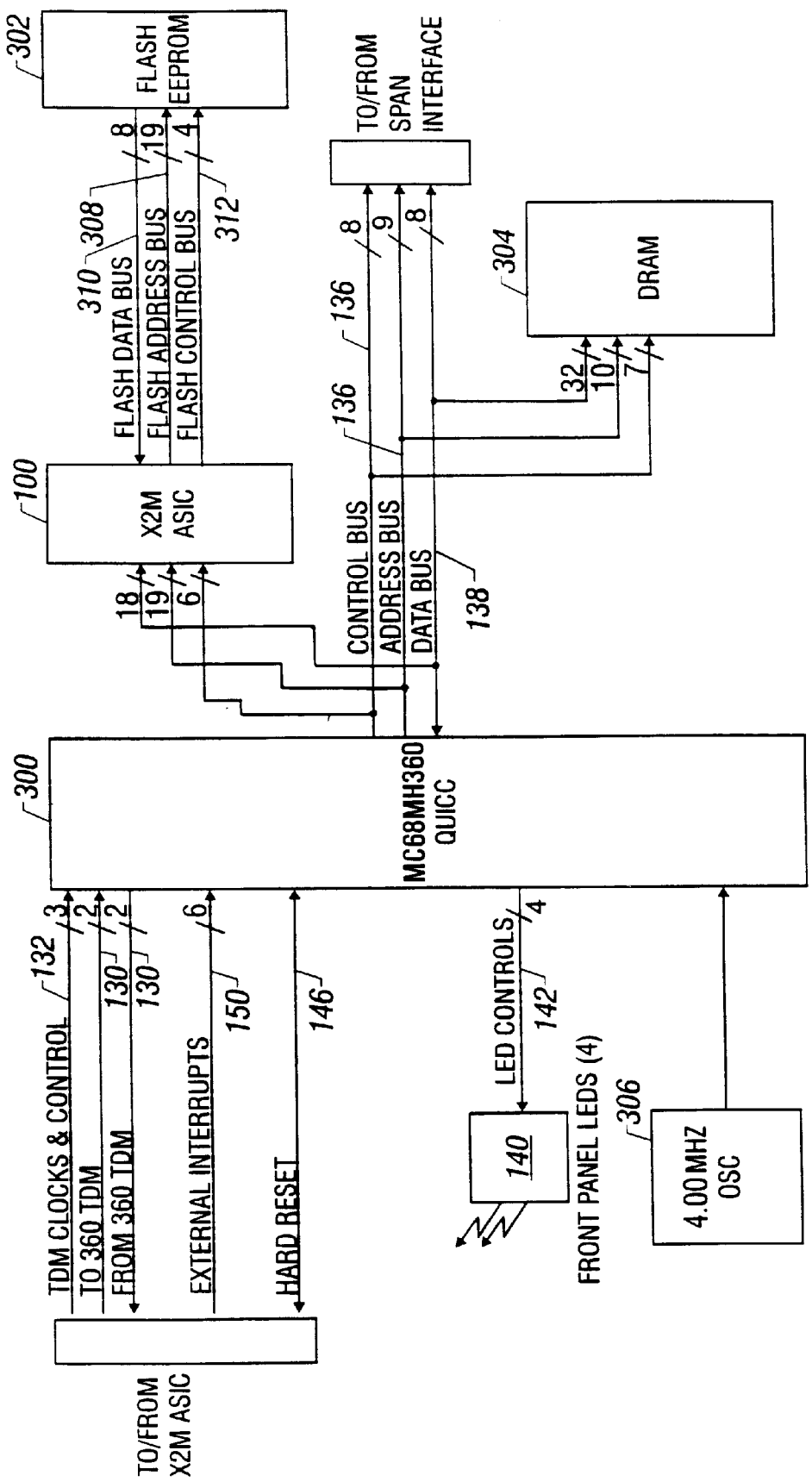
FIG. 5 is a functional block diagram of a processor node.

As shown in FIG. 5, the Processor node 116 (FIG. 3) includes a microprocessor 300 such as a Motorola MC68MH360 Quad Integrated Communications Controller (QUICC), an EEPROM 320 such as a 512 kb flash EEPROM, and a DRAM 304 such as a 4 Mb DRAM. A clock 306, for example a 4 MHz oscillator, is input to the microprocessor 300. The microprocessor 300 controls the memory with eight general purpose chip selects. The ASIC 100 uses the microprocessor 300 for interfacing to all memory and peripherals. Thus, the hardware need not provide fixed address decoding because the base address memory map is configured via software. EEPROM 302 contains configuration memory and lookup tables for the ASIC 100. EEPROM 302 also contains the boot code and non-volatile configuration storage for the microprocessor 300. The configuration address and data pins are connected to the Flash address bus 308 and flash data 310 bus. The ASIC 100 uses the flash control bus 312 to control access to the various components. The DRAM 304 provides the microprocessor 300 with volatile code and data storage.

Figure 6:
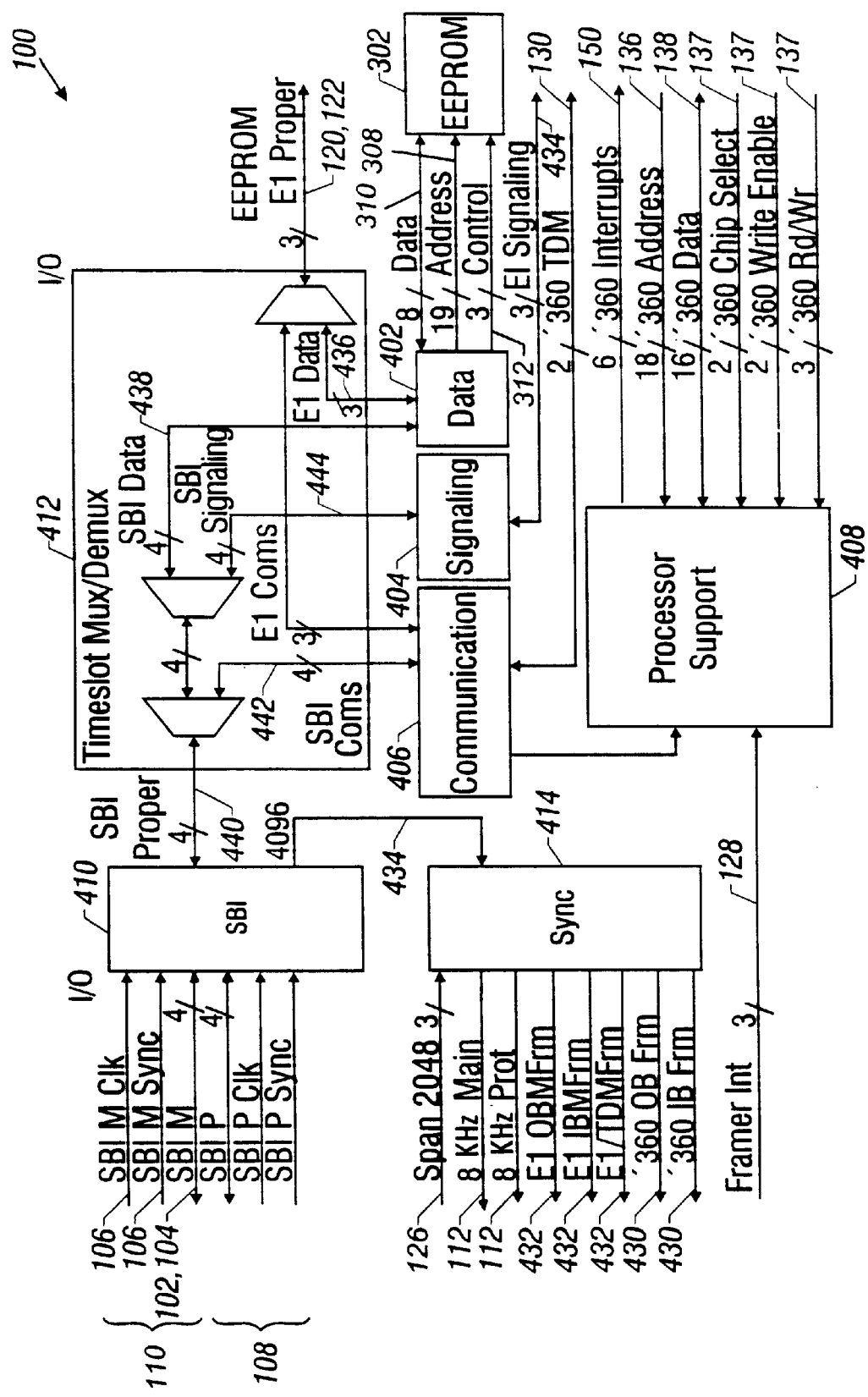
FIG. 6 is a functional block diagram of an application specific integrated circuit (ASIC).

As shown in FIG. 6, the ASIC 100 is divided into seven blocks: data 402, signaling 404, communications 406, processor support 408, SBI 410, time slot mux/demux 412, and network synchronization 414.

The data block 402 interfaces with the EEPROM 302 through the data 310, address 308, and control 312 buses and maps the TDM data channels between the SBI format and the E1 format. TDM mapping will be described below.

The signaling block 404 contains signaling translation RAM, signaling data RAM, and mapping of the signal between E1 and SBI. This block inserts the necessary CAS bits. This block is not used for message-oriented signaling (e.g. V5.1). When CAS is used, E1 bus 434 carries the CAS signaling bits.

The communications block 406 performs a time slot interchange (TSI) function. Any channel of any E1 or any SBI can be mapped to any of the 64 channels of the two TDM buses 130. In addition to setting up the TSI, software also provisions each mapped channel either as transparent (e.g., SBDL) or as HDLC. If provisioned for SBDL, the ASIC 100 (FIG. 3) does appropriate SBDL processing. The ASIC 100 (FIG. 3) can be provisioned by software to handle up to three SBDL channels for the three primary SBIs. The communications block also maps the E1 and SBI communications channels. These channels are used to communicate between the ASIC 100 and processor node 116 (FIG. 3) in a message-oriented system.

The processor support block 408 is used during setup, address decode, and memory decode. This block processes interrupts which includes the interrupts generated by the framer 128 and microprocessor interface. It also manages the status and control registers. This block communicates with the microprocessor 300 (FIG. 5) through the microprocessor control and address buses 136, 137 and sends interrupts 150 and data 138 as mentioned earlier.

The time slot mux/demux block 412 maps the internal TDM paths, as shown in FIG. 6, using a combination of channel counters and software provisional control. For example, a customer's voice/data travels the path in the following order: E1 Proper 120, 122, E1 data 436, SBI data 438, and SBI proper 440. The signaling bus 434, 444 carrying E1 and SBI signaling bits and the communications bus 130, 442 carrying the E1 and SBI communications bits are inserted/translated as needed.

The synchronization block 414 performs three main functions: (1) it takes the receive clock from the software selected span and divides the receive clock down to an 8 KHz signal which is sent to both the main and protect buses 112; (2) it generates microprocessor clock and frame 430; and (3) it generates E1 clock and frame 432. The synchronization block 414 also accepts clock signals from the span 126 and the SBI 434.

The SBI 410 is a serial bus by which interprocessor communications, signaling, and customer voice/data are passed between the line card 100 and a matrix (e.g., BPT 28, 38). The SBI main 110 and protect 108 buses connect the SBI to the matrix.

Figure 7:
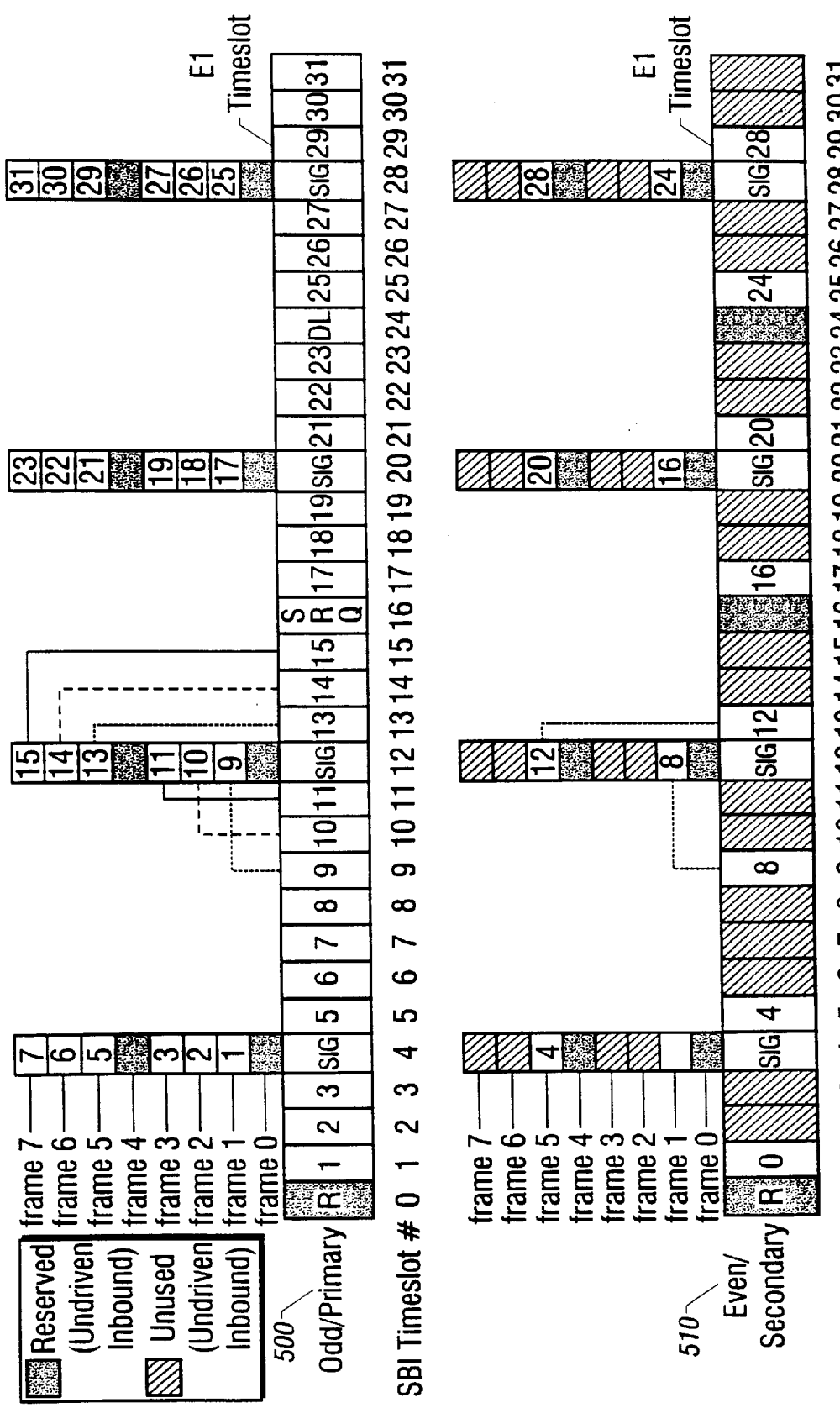
FIG. 7 illustrates the conversion of a generic E1 signal to SBI format.
Figure 8A:
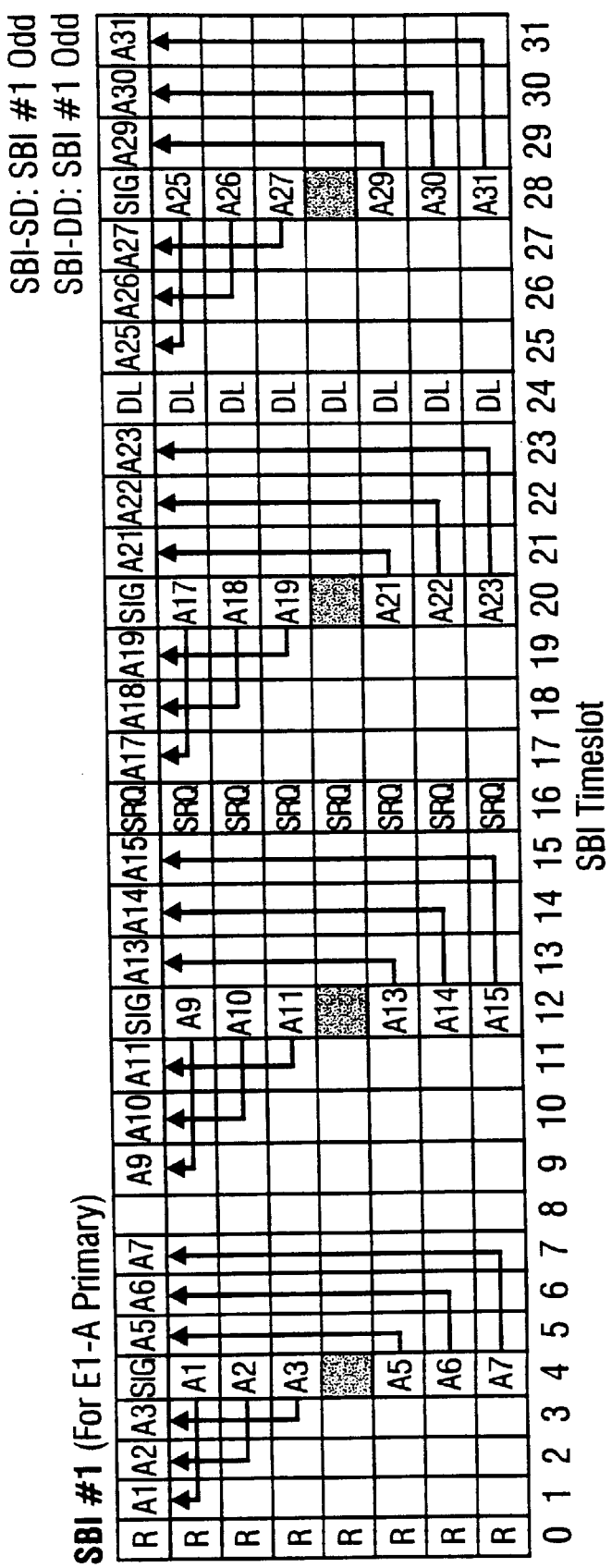
FIG. 8 illustrates a format for a message-oriented SBI signal generated by an E1 card.
Figure 8B:
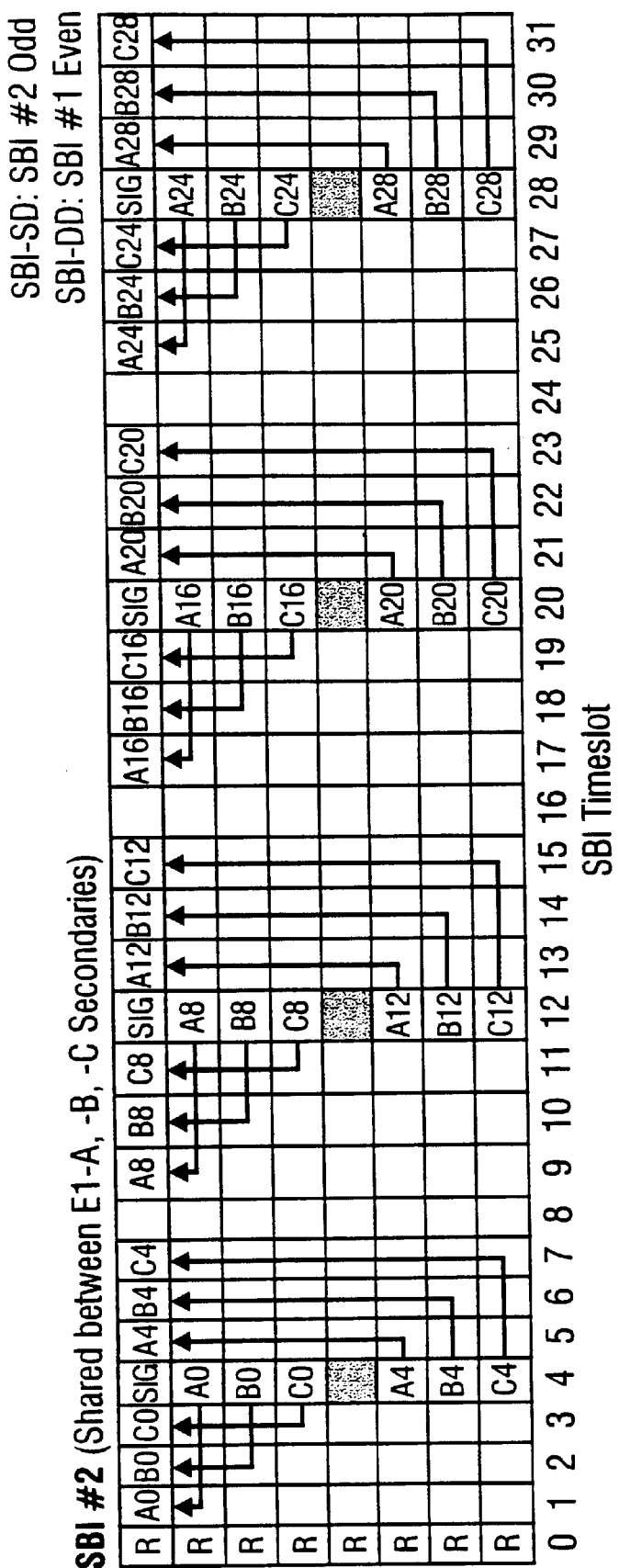
Figure 8C:
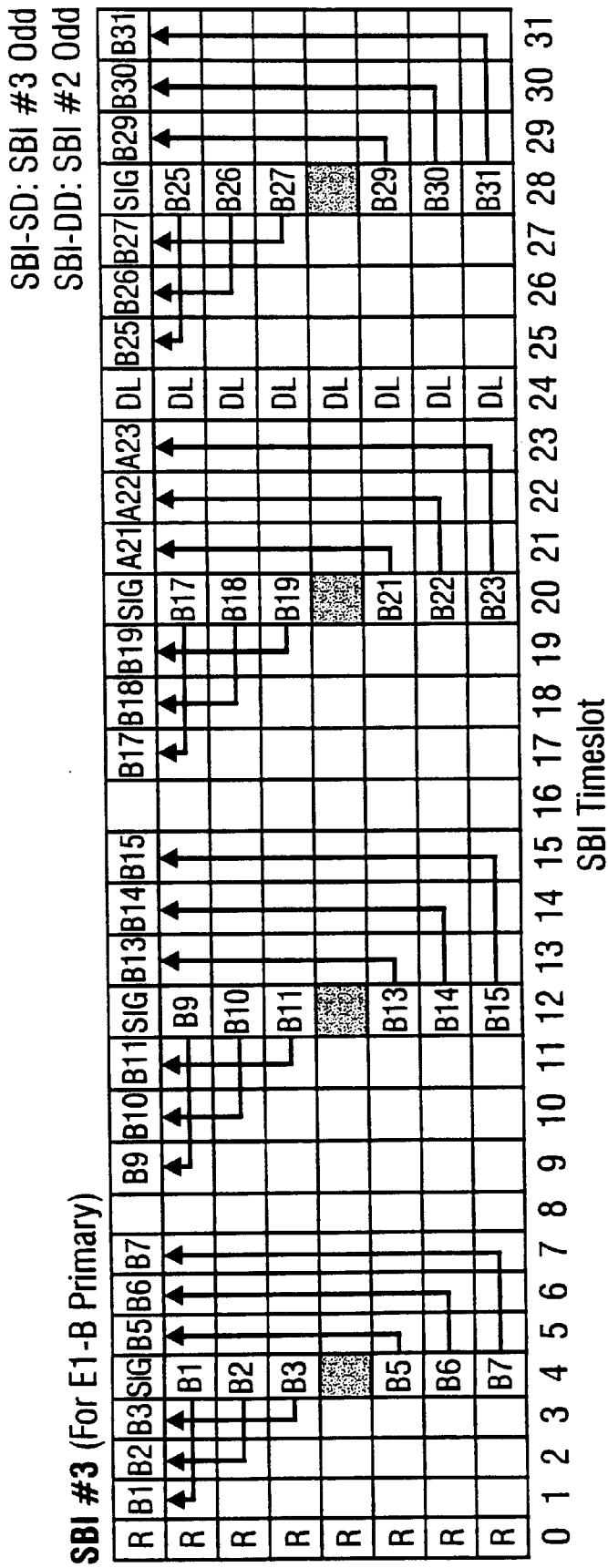
Figure 8D:
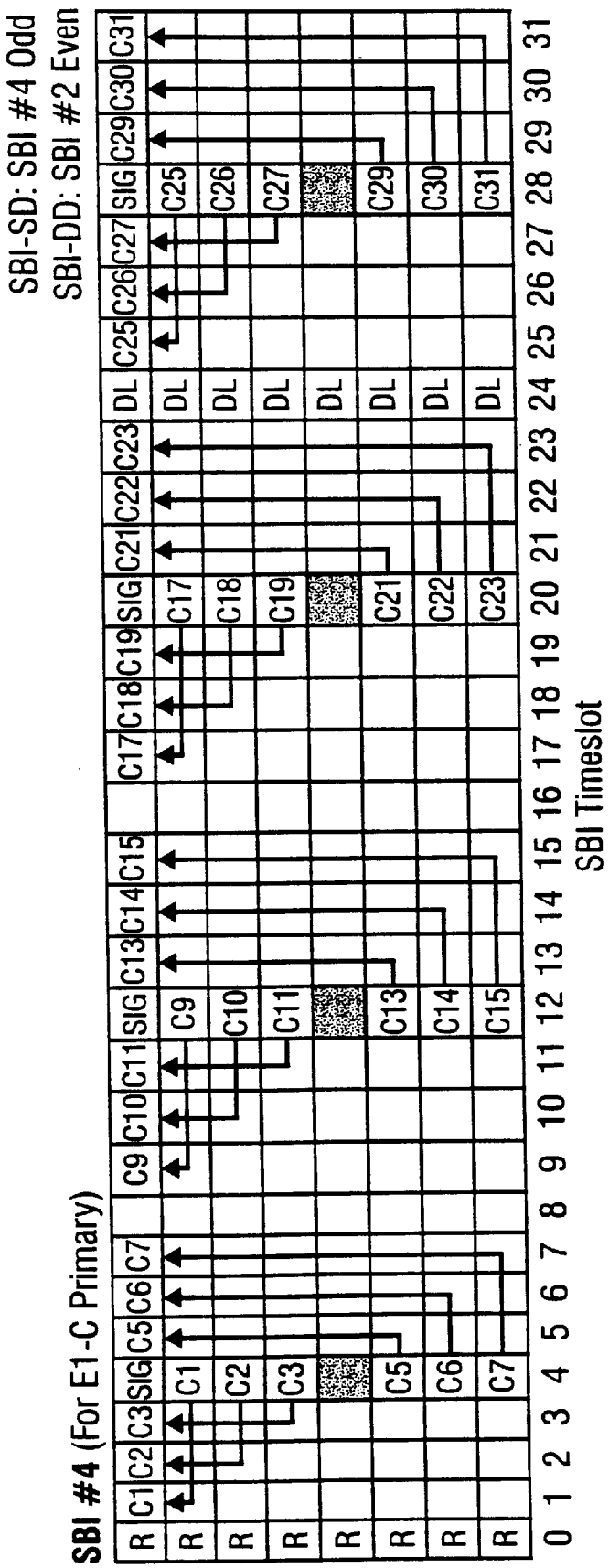

As shown in FIG. 7, a generic SBI signal is placed in odd 500 and even 510 channels. All the time slots of the SBI signal are mapped from corresponding E1 time slots. Because certain time slots are reserved, some frames do not have corresponding time slots available (i.e., 0, 4, 12, 16, 20, 24, 28). Those frames are placed in the even channel 510 as shown in FIG. 7. This is the SBI signal format for single E1.

As shown in FIG. 8, triple E1 mapping occurs in the ASIC block 100 using the software and hardware support of the previously described blocks. In general terms, triple E1 mapping maps the three even E1 channels to one SBI channel. The reserve, SBDL, SBI service request (SRQ), and signaling time slots channels are set up substantially in the same manner as in the single E1 case. The three odd SBI channels are remapped the same way as if they were single E1 channels. Because frames 2, 3, 6, 7, etc. on the even channels were unused in the single E1 case, the three E1 signals now share the same even channel. The displaced time slots of the second E1 signal are remapped to frames 2 and 6, etc., and the third E1 signal uses frames 3 and 7, etc. As a result, three E1 spans are transmitted using four lines in SBI format.

This setup of the hardware and software increases the capacity of each card. Each remote or central terminal is able to increase its capacity without a major hardware or software upgrade, thus lowering the cost per line. Three E1 lines can share one processor and one ASIC. Also, fewer channels are used in the transmission and reception of SBI signals. In the conventional arrangement, sending three E1 signals costs six channels, but using the method and techniques described here, sending three E1 signals costs only four channels. Maintaining four lines is more economical than maintaining six. In addition, there is no reduction in quality. Being message-oriented, the system described here has even better quality of service than the CAS system.

A channel unit card also can function as a multiple high-bit-rate digital subscriber loop (HDSL) card. A card that sends and receives multiple HDSL signals is able to send and transmit multiple signals per card, thus lowering the per line cost. The fact that only one board is needed to be manufactured to produce both the multiple E1 card and a multiple HDSL card also contributes to the lower cost per line. By having cards that carry multiple signals, more subscribers are served per card.

Figure 9:
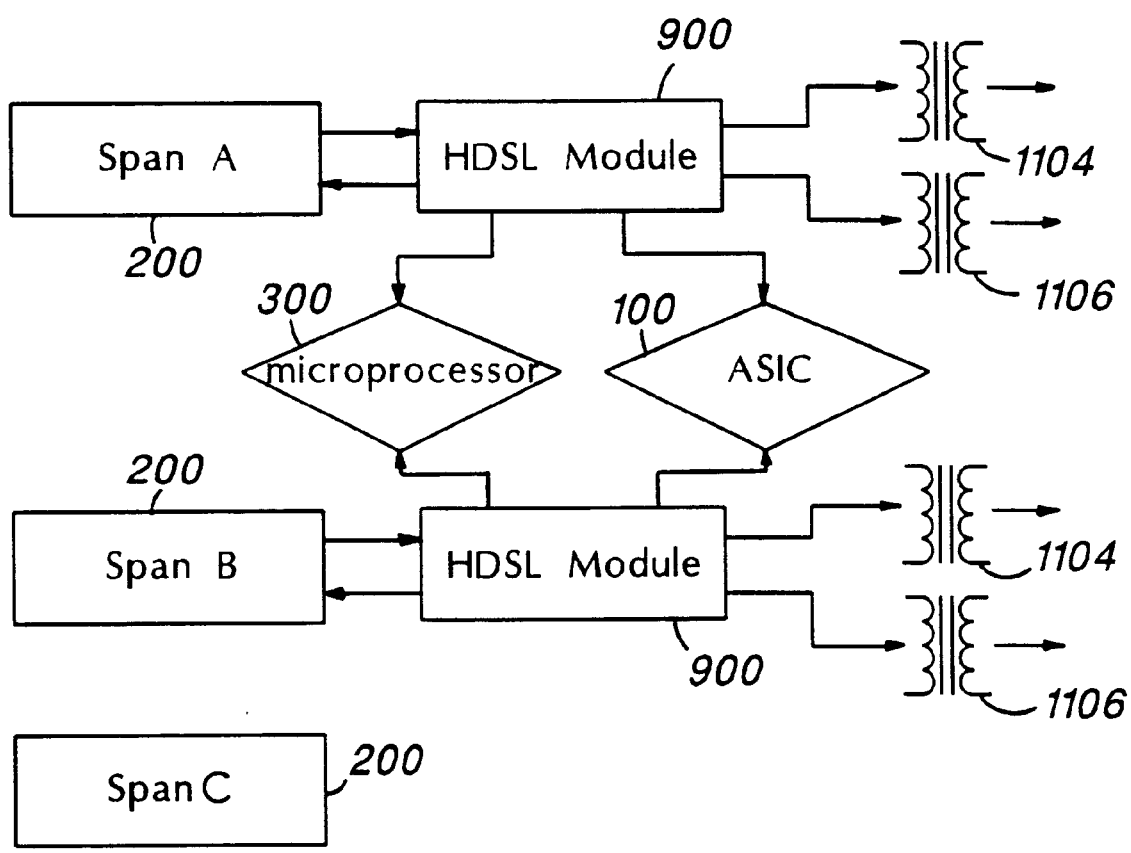
FIG. 9 is a functional block diagram of multiple HDSL module connections on an E1 card.

As shown in FIG. 9, the E1 card is designed also to function as a multiple HDSL card. This is accomplished by attaching a plurality of HDSL modules (e.g., HDSL transceiver module 900 available from ADTRAN part number 1244.101L1) and line transformers 1104, 1106 onto the card. As shown in FIG. 9, two HDSL modules 900 and four line transformers are designed to fit on the single card. The HDSL modules 900 interface with the microprocessor 300, four line transformers 1104,. 1106 and two of the spans. The Modules 900 are to connect to the framer portion of span A and B (e.g., LIU/Framer 200 available from Brooktree part number BT8370). Span C is not used in this embodiment. Because the connections to the two HDSL modules 900 are identical, only one will be explained below.

Figure 10:
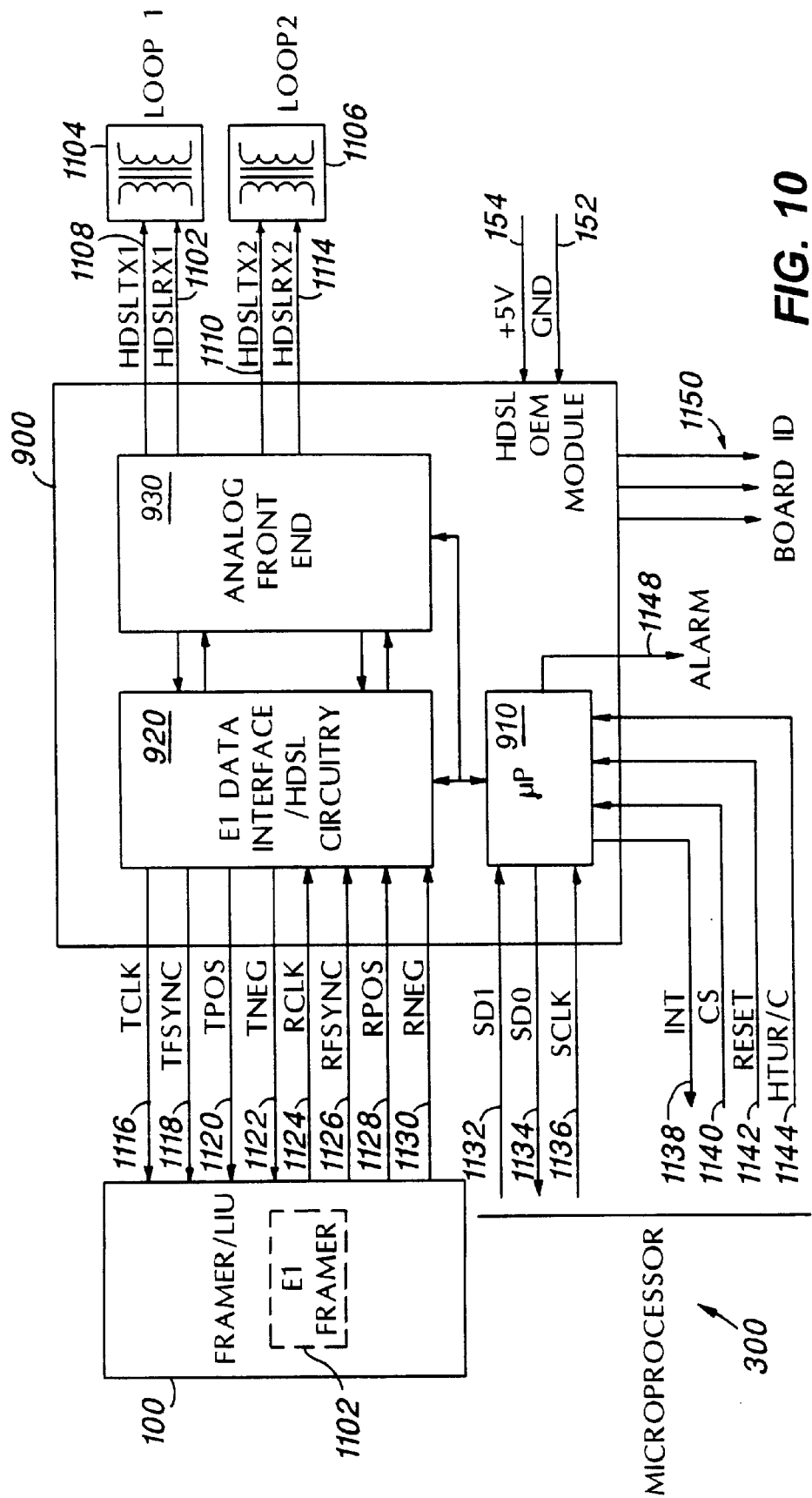
FIG. 10 is a functional block diagram of connections to an E1 HDSL Module.

As shown in FIG. 10, with the HDSL modules attached, this board can become a HDSL board. The framed E1 signal, after passing through the data interface/HDSL circuitry 920 and the analog front end 930, is converted to HDSL. For example, data can be transmitted at a higher data rate over two copper twisted pairs as compared to the AMI data.

The E1 card is specially designed to accept the HDSL modules. The E1 framer's 1102 signals RCLK 1124, RFSYNC 1126, RPOS 1128, and RNEG 1130 are not used when the card is being used as the E1 card 52 (FIG. 2). When functioning as a HDSL module, these signals are used as input to the HDSL module 900, which transmits to the framer 1102 the following signals: TCLK 1116, TFSYNC 1118, TPOS 1120, and TNEG 1122. In this example, TFSYNC 118 is not used, and the three other signals are connected to the framer receiver pins that were not being used in the multiple E1 card 52 (FIG. 2). The microprocessor 300 communicates with an HDSL microprocessor 910 on the module. The INT' (interrupt) 1138, CS' (chip select) 1140, RESET' 1142, HTUR/C' (for selecting mode of operation) 1144, SCLK (synchronous serial interface clock input) 1136, SDO (tri-stateable synchronous serial output) 1134, SDI (synchronous serial input) 1132, and alarm allow the HDSL microprocessor 910 and the microprocessor 300 to function together. The output from the HDSL module travels to one of two sets of line transformers. One set is line transformer 1104, which is being interfaced by the HDSLTX1 1108 and HDSLRX1 1112 differential line transceivers, and the other set is the line transformer 1106, which is interfaced by the HDSLTX2 1110 and HDSLRX2 1114 differential line transceivers. The HDSL module identifies itself to the ASIC 100 (FIG. 3) through 3 ID pins 150. Each HDSL module needs +5 V to operate so connections to ground (152) and +5 volts (154) also are provided.

One embodiment of the invention has been described above with reference to the accompanying figures. It is to be understood the invention could also be applied to other signals in other configurations, such as for example a T1 system comprising a T1 LIU/Framer and a variation of the software. In other words, the invention is not limited to the specific embodiment, and other embodiments are within the scope of the following claims.

What is claimed is:

1. A telecommunications channel unit card comprising:
   a subscriber bus interface for communicating subscriber bus signals with a digital loop carrier matrix;
   wideband channels for communicating wideband telecommunications signals with the subscriber bus interface and an external network;
   at least one high-bit-rate digital subscriber line (HDSL) module capable of being coupled selectively to at least one of the wideband channels to facilitate HDSL-based communications between the telecommunications channel unit card and the external network; and
   at least one span circuit including a line interface unit (LIU) portion and a channel framer portion.

2. The telecommunications channel unit card of claim 1 wherein a HDSL module is coupled to at least one of the wideband channels through the channel framer portion of the span circuit.

3. The telecommunications channel unit card of claim 1 wherein outgoing wideband telecommunications signals received from at least one of the wideband channels are framed using the channel framer portion of the span circuit.

4. The telecommunications channel unit card of claim 1 further comprising a conversion circuit for converting subscriber bus signals and wideband telecommunications signals.

5. The telecommunications channel unit card of claim 4 wherein the wideband telecommunications signals comprise E1 or T1 signals.

6. The telecommunications channel unit card of claim 1 wherein the digital loop carrier matrix comprises a bandwidth allocator, processor and timing unit (BPT) card.

7. A method of configuring the channel unit card comprising:
   providing a subscriber bus interface for communicating subscriber bus signals with a digital loop carrier matrix;
   connecting the subscriber line interface with wideband channels; and
   selectively coupling a high-bit-rate digital subscriber line (HDSL) module to at least one of the wideband channels to enable HDSL-based communications,
   wherein the channel unit card comprises at least one span circuit having a line interface unit (LIU) portion and a channel framer portion.

8. The method of configuring the channel unit card of claim 7 further comprising:
   coupling the HDSL module to at least one of the wideband channels through the channel framer portion of the span circuit.

9. The method of configuring the channel unit card of claim 7 further comprising:
   framing outgoing wideband telecommunication signals from at least one of the wideband channels using the channel framer portion of the span circuit.

10. The method of configuring the channel unit card of claim 7 further comprising:
    converting the subscriber bus interface signals and the wideband telecommunications signals.

11. The method of configuring the channel unit card of claim 10 wherein the wideband telecommunications signals comprise E1 or T1 signals.

12. The method of configuring the channel unit card of claim 7 wherein the digital loop carrier matrix comprises a bandwidth allocator, processor, and timing unit (BPT) card.

13. A telecommunications channel unit card comprising:
    a subscriber bus interface for communicating subscriber bus interface (SBI) signals with a bandwidth allocator, processor and timing unit (BPT) card;
    wideband channels including a processor capable of processing message-based applications, an application specific integrated circuit (ASIC) between the subscriber bus interface and span circuits capable of converting the subscriber bus interface signals and E1 signals, and three span circuits each including one line interface unit (LIU) portion and one E1 framer portion for interfacing between the ASIC and an external network;
    the E1 framer portion framing the E1 signals for transmission over the external network and for recovering the E1 signals from reception over the external network;
    the line interface unit capable of connecting to the external network when the channel unit card functions as an E1 card; and
    two high-bit-rate digital subscriber line (HDSL) modules having their clocks and signals pins connected to the corresponding clocks and signals pins of two corresponding E1 framer portions to facilitate HDSL-based communications between the telecommunications channel unit card and the external network.

* * * * *